June 23, 1942.     H. R. MOULTON     2,287,632
MULTIFOCAL LENS
Filed Sept. 13, 1939
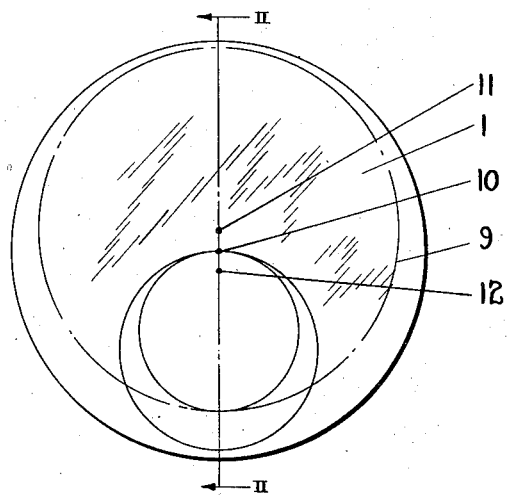
Fig. I
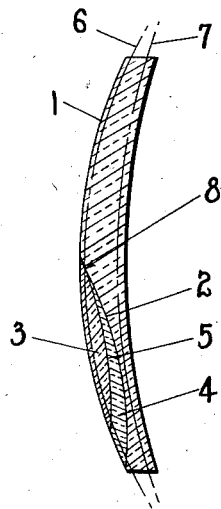
Fig. II
INVENTOR.
HAROLD R. MOULTON
BY Harry H. Styll
ATTORNEY.

Patented June 23, 1942

2,287,632

UNITED STATES PATENT OFFICE 2,287,632

MULTIFOCAL LENS

Harold R. Moulton, Southbridge, Mass., assignor to American Optical Company, Southbridge, Mass., a voluntary association of Massachusetts Application September 13, 1939, Serial No. 294,721

2 Claims. (Cl. 88—54)

This invention relates to improvements in ophthalmic lenses and has particular reference to an improved multifocal lens and method of making the same.

One of the principal objects of the invention is to provide an improved form of multifocal lens having one of its focal fields of a circular contour or shaped to a line of revolution with the effective optical center of said focal field removed from the center of said circular line of revolution and process of making the same.

Another object is to provide a multifocal lens having a major portion for distance vision and a minor portion for near vision embedded in the major portion, both portions being finished to one continuous curve, the minor portion having a substantially circular contour blended into the finished curve and having its upper edge lying below the optical center of the major portion and above the optical center of the minor portion.

Another object is to provide a multifocal lens having a major portion for distance vision and a minor portion for near vision embedded in said major portion, both of said portions being finished to one continuous curve, the minor portion having a substantially circular contour blended into the finished curve and having its optical center removed from the center of its circular edge.

Another object is to provide a new and improved form of multifocal lens wherein the optical center of the segment is substantially coincident with the optical center of the distance vision portion, with the contour of said segment having a substantially feather or knife-like edge.

Another object is to provide an improved lens of the above character and process of making the same, whereby no edge fusions are necessary.

Another object is to provide a relatively simple and inexpensive multifocal lens of the type having the optical centers of its respective focal fields substantially coincident so that the resulting lens is substantially monaxial, whereby the line of division between said different focal fields will be relatively thin and substantially invisible.

Another object is to provide a multifocal lens with a focal field having a circular contour, with the optical centers of the respective focal fields located substantially at the point of tangency of the two focal fields, or respectively above and below said point of tangency, and novel process of making the same.

Other objects and advantages of the invention should become apparent from the following description taken in connection with the accompanying drawings, and it will be apparent that many changes may be made in the details of construction, arrangement of parts and steps of the process shown and described without departing from the spirit of the invention as expressed in the accompanying claims. I, therefore, do not wish to be limited to the exact details of construction, arrangement of parts and steps of the process shown and described as the preferred form only has been given by way of illustration.

Referring to the drawing:

Fig. I is a front elevation of a blank for the multifocal lens embodying the invention; and Fig. II is a sectional view taken as on line II—II of Fig. I and looking in the direction indicated by the arrows.

It has been usual in the past in forming multifocal lenses of the type having a segment of glass of a different index of refraction fused to a major piece of glass and having the optical centers of the different focal fields substantially coincident with each other, to provide a relatively thick line of division between the different focal fields. When the eye travelled from one focal field to the other it was necessary for it to traverse this relatively thick line of division. Such thick lines of division embodied difficult and costly steps of manufacture and in many instances also introduced annoying reflections during use. Such relatively thick lines of division also are readily visible.

One of the prime objects, therefore, of the present invention is to provide a multifocal lens of the type having the optical centers of the different focal fields substantially coincident with each other, or with the center of the major field above and the minor field below the line of division between the fields predetermined amounts, and which is so constructed as to obviate the necessity of undesirable and costly edge fusions and also eliminates the edge surface reflections and the visible dividing line inherent with prior art constructions.

Referring more particularly to the drawings, wherein like characters of reference designate like parts throughout the several views, the lens embodying the invention comprises a major portion of lens medium 1, having a countersink 2 therein. In the countersink 2 there are fused two superimposed segments of glass 3 and 4 of indices of refraction which are different from each other and one of which is different from the index of refraction of the major piece of lens medium.

In forming the lens a major piece of lens medium of ordinary optical glass having a relatively high index of refraction of approximately 1.6 or more is used. A countersink 2 is ground and polished in one face thereof by the usual optical abrading methods. In this countersink 2 a segment of glass 4 of a relatively low index of refraction of approximately 1.52 or less is provided, with a ground and polished surface of substantially the same curvature as the curve of the countersink. This segment of glass 4 is then fused to the countersink 2. A second countersink 5 is then ground and polished in the composite piece of lens medium to a predetermined surface curvature which intersects the curve of the countersink 2 at a predetermined point. A minor piece of lens medium 3 of a relatively high index of refraction of approximately 1.6 or higher is ground and polished on one side to a surface curvature which is substantially that of the curve of the countersink 5. This minor piece of lens medium 3 is then fused in said countersink 5. A relatively continuous finished optical surface of a predetermined curvature such as indicated by the dot and dash line 6 is then formed on the major portion 1 and on the segment and minor inserts 3 and 4. The opposite side of the blank is then ground and polished with a suitable prescriptive curve 6.

It may also be desirable to use glasses for the various parts having a relatively high reciprocal relative dispersion or such combinations which will reduce chromatic aberrations as are known in the art.

It is to be understood that the curvatures of the countersink and indices of refraction of the segment 4 and minor piece of lens medium 3 are carefully computed according to the resultant focal power desired in the finished minor focal field of the lens. This field is composed mainly of the superimposed segment and minor pieces of lens medium 3 and 4.

The index of refraction of the inner portion 4, together with the surface curvatures of the countersinks 2 and 5, and the angle between said surfaces is so controlled as to introduce a minus prism power which results in the displacement of the optical center of the minor focal field of the lens to a position 10 adjacent the line of division between the two focal fields of the finished lens, or to any desired related positions such as diagrammatically illustrated at 11 and 12.

It is to be noted that the surface curvature 6 is ground to a controlled depth to about the point of intersection of the countersinks 2 and 5, as illustrated at 8. This is to cause the finished lens to have a feather or knife-like edge at the line of division 10 between the two focal fields.

The minus prism component of the lens may be so controlled as to position the optical center of the minor focal field of the lens substantially at the dividing line between the two fields, or may be so controlled as to position the optical center of said minor field a distance below said dividing line substantially equal to half the full diameter of the pupil of the eye. The surface curvatures of surfaces 6 and 7 may be so controlled as to position the optical center of the major field at said dividing line, or point 8 on the lens, or at a distance above said line substantially equal to half the full diameter of the pupil of the eye or slightly more.

It is also to be understood that one of said centers may be positioned at the dividing line and the other, above or below said dividing line as desired. The lens is then cut and edged along a line 9 to the desired finished contour shape. The height of the dividing line with respect to the line of straight ahead vision or position of optical center of the major portion may be controlled by the angling of the surface 7 relative to the surface 6 and during the laying out of the contour shape and size of the lens. The cutting and edging of the lens is thereafter generated about said optical center.

It is to be understood, therefore, that the amount of minus prism introduced by the segment portion 4 depends upon the power which is to be introduced in the minor focal field by the minor piece of lens medium 3 and by the curve of the countersink 5. The index of refraction of the minor piece 3 and the curve of the countersink 5 is so controlled as to introduce the power addition desired in the minor focal field of the lens. After having computed the surface curvature of the countersink 5 according to the index of refraction of the minor piece 3, the curvature of the countersink 2 is then computed and the index of refraction of the segment portion 4 is selected so as to introduce the minus prism power desired.

The angle between the surfaces 5 and 2 and the index of refraction of the portion 4 introduces the minus prism power and the angle between the surfaces 5 and 2 is controlled during the forming of said surfaces according to the index of refraction of the portion 4 so as to shift the effective optical center of the minor focal field to desired relation with the line of division or point 8 between the finished focal fields of the lens. The power of the prism therefore is controlled partially by the index of refraction of the segment portion 4 and by the increasing or decreasing of the angle between the countersinks 5 and 2 and may be varied to locate the effective optical center and said angle and index of the segment portion 4 may be so controlled as to position the effective optical center of the minor focal field of the lens at the dividing line between the two fields as illustrated at 10 or below said dividing line as illustrated diagrammatically at 12. The optical center of the major focal field embodying the major portion of the lens medium 1 may be located at said dividing line as illustrated at 10 and substantially coincident with the optical center of the minor focal field at said dividing line or may be positioned above said dividing line as illustrated at 11. This is accomplished by tilting the surface 7 relative to the surface 6 or may be generated by the surface 7 about an axial line passing through the points 10 or 11 as desired. When passing through the point 10 the optical center of the major focal field will be coincident with the optical center of the minor focal field and when passing through the point 11 will lie above the dividing line between the two fields. The power introduced by the segment portion 3 is controlled by the curve 6 in combination with the countersink curve 5 and the resultant power of the minor focal field is controlled in part by the superimposed portion of lens medium 1 to which the composite minor portion is secured.

It is to be understood that although applicant has shown and described the forming of separate countersinks 2 and 5, the use of suitably ground and polished multi-layer lens media may be formed by a drawing, blowing, or cementing process or the like and may be used to eliminate the forming of one of said countersinks.

It is also to be understood that the various indices of refraction given are only by way of illustration and that other desirable combinations may be used, which combinations are known in the art.

In the finished lens, therefore, it is to be understood that both of the optical centers of the minor and major focal fields of the lens may be located on the line of division as illustrated at 10, at the respective centers, or may be positioned above and below said line of division, as illustrated at 11 and 12, if desired.

It is particularly pointed out that the minor focal field of the lens embodying the invention has a contour edge which is circular or a line of revolution resulting from the inner section of curved surfaces by the effective optical center of said focal field of said minor focal field is removed from the center of the circular shape of said minor focal field.

From the foregoing description it will be seen that simple, efficient and economical means and process have been provided for accomplishing all of the objects and advantages of the invention.

Having described my invention, I claim:

1. A blank for a multifocal lens comprising a major piece of lens medium of a relatively high index of refraction having a countersink curve therein, a minor piece of lens medium of a relatively low index of refraction secured in said countersink, said minor piece of lens medium having a countersink curve therein angularly disposed relative to the major countersink so as to intersect said major countersink adjacent a given contour edge portion thereof, a segment of lens medium of a relatively high index of refraction secured in the countersink in said minor piece of lens medium and a curved optical surface on said segment side of the composite pieces of lens medium formed to such a depth as to cause a portion of the contour edge of said segment and the line of intersection of the countersink curve of said minor piece of lens medium with the countersink curve of the major piece of lens medium to be substantially coincident, the curvature of the countersink in the minor piece of lens medium being of a shorter radius than the curvature of the countersink in the major piece of lens medium.

2. A multifocal lens comprising a major piece of lens medium of a relatively high index of refraction having a countersink curve therein, a minor piece of lens medium of a relatively low index of refraction secured in said countersink, said minor piece of lens medium having a countersink curve therein angularly disposed relative to the major countersink so as to intersect said major countersink adjacent a given contour edge portion thereof, a segment of lens medium of a relatively high index of refraction secured in the countersink in said minor piece of lens medium, a curved optical surface on said segment side of the composite pieces of lens medium formed to such a depth as to cause a portion of the contour edge of said segment and the line of intersection of the countersink curve of said minor piece of lens medium with the countersink curve of the major piece of lens medium to be substantially coincident, the curvature of the countersink in the minor piece of lens medium being of a shorter radius than the curvature of the countersink in the major piece of lens medium, and a curved optical surface on the opposed side of said major piece of lens medium.

HAROLD R. MOULTON.